United States Patent

Gaub et al.

(10) Patent No.: US 6,478,912 B2
(45) Date of Patent: Nov. 12, 2002

(54) REVERSIBLY SWITCHABLE PRIMERS

(75) Inventors: Hermann Gaub, Rotwandhaus (DE); Andreas Mittelbach, Unterhaching (DE); Peter Jaenker, Garching (DE); Felix Nitschke, Munich (DE); Ulrich S. Schubert, Ismaning (DE)

(73) Assignee: DaimlerChrysler AG, Stuttgart (DE)

( * ) Notice: Subject to any disclaimer, the term of this patent is extended or adjusted under 35 U.S.C. 154(b) by 81 days.

(21) Appl. No.: 09/767,213

(22) Filed: Jan. 22, 2001

(65) Prior Publication Data

US 2001/0054475 A1 Dec. 27, 2001

(30) Foreign Application Priority Data

Jan. 22, 2000 (DE) .......................................... 100 02 697

(51) Int. Cl.[7] .................................................. C09J 1/00
(52) U.S. Cl. ........................ 156/152; 156/242; 156/247; 156/344; 427/156; 427/327; 427/402; 428/457
(58) Field of Search ................................ 156/242, 247, 156/344, 152; 427/156, 327, 402; 428/457

(56) References Cited

U.S. PATENT DOCUMENTS

| | | | |
|---|---|---|---|
| 4,022,649 A | | 5/1977 | Nakagone et al. .......... 156/309 |
| 5,810,980 A | * | 9/1998 | Edelson |
| 5,830,577 A | * | 11/1998 | Murayama et al. |
| 2001/0014731 A1 | * | 8/2001 | Gaub et al. |

OTHER PUBLICATIONS

Chemical Abstracts 132, No. 237487, "Design, synthesis and first metal complexes of dentritic 5,5'–disubstituted 2,2":6'2" terpyridine ligands" 1999.
Chemical Abstracts 132, No. 181392, "Designated functionalized block copolymers with metal complexing terpyridine units" 1999.

* cited by examiner

*Primary Examiner*—Curtis Mayes
(74) *Attorney, Agent, or Firm*—Davidson, Davidson & Kappel, LLC

(57) ABSTRACT

A ligand layer on a metal surface is capable of being reversibly switched between adhesion and deadhesion. The ligand layer includes substituted pyridine dimers and/or pyridine trimers which are selected from the group consisting of:

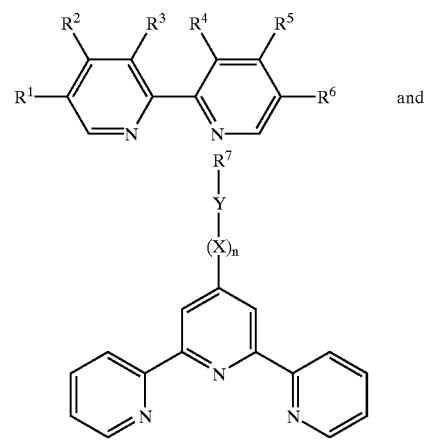

with $R^1$ through $R^6$ being able to be equal or different and being selected from the group consisting of —R—CH(O)CH$_2$, OH, —O—R, NR$_2$, NHR, NH$_2$, CO$_2$H, CO$_2$R, R and H. R is selected from the group consisting of alkyl and aryl residues with the proviso that not all residues $R^1$ through $R^6$ are hydrogen atoms at the same time. $R^7$ is selected from the group consisting of —R—CH(O)CH$_2$, OH, —O—R, NR$_2$, NHR, NH$_2$, CO$_2$H, CO$_2$R, CONHR, R and H, with R being selected from the group consisting of alkyl and aryl residues. Y is selected from the group consisting of silicon, carbon, nitrogen, phosphorus and oxygen atoms, and X is an oxygen, sulfur or phosphorus atom, and n having the value 0 or 1.

25 Claims, 1 Drawing Sheet

REVERSIBLY SWITCHABLE PRIMERS

FIELD OF THE INVENTION

The present invention relates generally to primers, and, in particular, a primer which may be reversibly switched between adhesion and deadhesion, and to a method of preventing metal corrosion using the primer.

RELATED TECHNOLOGY

In the case of conventional primers (adhesion promoters, for example, isocyanate compounds) an irreversible bonding to surfaces via covalent bonds takes place. During bond-breaking reactions of these primers, the structural elements of the primers are irreversibly destroyed. In addition, the amount of energy needed for bond-breaking/destroying the known surface primers is relatively large. Therefore, it is not possible to switch back and forth between adhesion and deadhesion.

U.S. Pat. No. 4,022,649 describes a metal laminate having high thermal stability which is produced by forming a cured film layer of a thermally stable heterocyclic polymer such as polyamide imide having only a small content of volatile components on at least one surface of one or both of metal plates or foils, for example, of aluminum, separately forming an adhesive layer of a thermally stable heterocyclic polymer having a thickness of one-third or less of the above mentioned film layer and containing a volatile matter in an amount of not more than 20% by weight, and then heat bonding both of the metal plates or foils through the above mentioned adhesive layer with the film layer being oriented toward the adhesive layer. The described polymer layer decomposes at temperatures above 300° C. and cannot be reversibly removed from the metal surface for the above-mentioned reasons.

SUMMARY OF THE INVENTION

Therefore, an object of the present invention is to provide a primer which can be reversibly switched back and forth between adhesion and deadhesion as well as methods for reversibly switching a primer on a metal surface between adhesion and deadhesion. The present invention provides a ligand layer on a metal surface, the ligand layer being capable of being reversibly switched between adhesion and deadhesion, and including substituted pyridine dimers and/or pyridine trimers which are selected from the group consisting of:

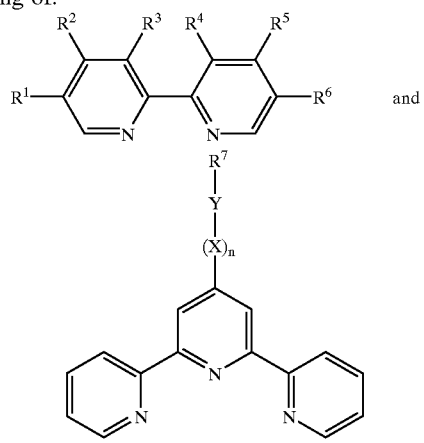

$R^1$ through $R^6$ being able to be equal or different and being selected from the group consisting of —R—CH(O)CH$_2$, OH, —O—R, NR$_2$, NHR, NH$_2$, CO$_2$H, CO$_2$R, R and H with R being selected from the group consisting of alkyl and aryl residues with the proviso that not all residues $R^1$ through $R^6$ are hydrogen atoms at the same time. $R^7$ is selected from the group consisting of —R—CH(O)CH$_2$, OH, —O—R, NR$_2$, NHR, NH$_2$, CO$_2$H, CO$_2$R, CONHR, R and H, with R being selected from the group consisting of alkyl and aryl residues. Y is selected from the group consisting of silicon, carbon, nitrogen, phosphorus and oxygen atoms, with X being an oxygen, sulfur or phosphorus atom, and n having the value 0 or 1.

In an embodiment of the ligand layer on a metal surface according to the present invention, $R^1$ through $R^6$ are selected from the group consisting of —R—CH(O)CH$_2$, —O—R, CO$_2$R, CONHR and R with R being selected from the group consisting of alkyl and aryl residues. $R^7$ is selected from the group consisting of —R—CH(O)CH$_2$, —O—R, CO$_2$H, CO$_2$R, NR$_2$ and R, with R being selected from the group consisting of alkyl and aryl residues. Y is selected from the group consisting of silicon, carbon, nitrogen, phosphorus and oxygen atoms. X is an oxygen atom, and n has the value 1.

The alkyl residues may contain 1 to 30 carbon atoms.

The present invention also provides a method for reversibly switching a ligand layer on a metal surface according to the present invention between adhesion and deadhesion, including the steps of (a) applying a primer solution;
(b) drying the primer film;
(c) applying an adhesive or lacquer;
(d) curing of the adhesive or lacquer;
(e) deadhesion of the primer/adhesive composite or primer/lacquer composite by applying a direct voltage to the composite, by changing the pH value of the composite or by changing the temperature of the composite; and
(f) possibly, repeated adhesion of the primer/adhesive composite or primer/lacquer composite by applying a direct voltage opposite in polarity to that of step (e), or by changing the pH value or the temperature of the composite.

In an embodiment of the method according to the present invention, the deadhesion or adhesion in steps (e) and, possibly, (f) are caused by applying a direct voltage in the range from 1.0 to 1,000 V, preferably 5 to 500 V, in particular 10 to 100 V.

In another embodiment of the method according to the present invention, the deadhesion or adhesion in steps (e) and, possibly, (f) are caused by changing the pH value to a range from 1 to 13, preferably a range from 5 to 10.

In yet another embodiment of the method according to the present invention, the deadhesion or adhesion in steps (e) and, possibly, (f) are caused by raising the temperature to 40 to 250° C., preferably to 60 to 150° C., in particular to 70 to 100° C.

Moreover, the present invention provides a method for inhibiting metal corrosion, including the application of a ligand layer according to the present invention to a metal surface.

DETAILED DESCRIPTION

The metal onto whose surface a ligand layer according to the present invention may be applied may be selected from groups II through XIV of the periodic system. In particular, the metal may be selected from the group consisting of iron, zinc, aluminum, magnesium, platinum, silver, gold, chromium, nickel, titanium, copper, scandium, zirconium, vanadium, molybdenum, manganese, tungsten and cobalt as well as from alloys including these metals.

Figure 1:
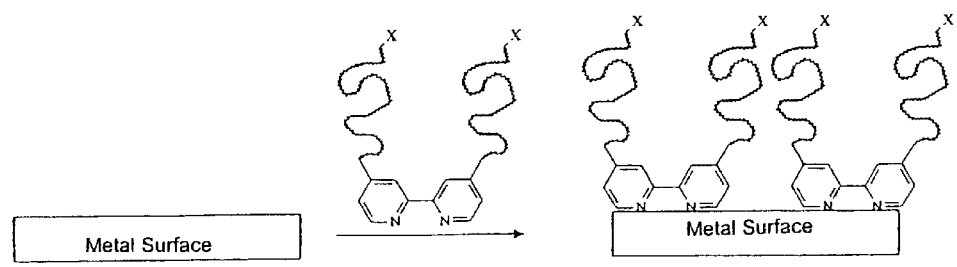
FIG. 1 shows a schematic diagram of a formation of ligand layers on a metal surface.

Special pyridine oligomer-containing ligands such as ligands on the basis of bipyridines are capable of selectively, non-covalently complexing metal surfaces (e.g., Fe, Zn, Al, Mg, Pt, Ag, Au), forming ligand layers on the metal surfaces, as shown in FIG. 1.

By the controlled influence of temperature, pH value and/or electric current, these layers can be switched back and forth between adhesion and deadhesion (detachment of the bond from the surface).

These layer-forming ligands can be provided with long-chain, hydrophobic, terminally reactive groups which can react with other reactive polymers or resins or which give rise to a bond by mechanical looping. Because of this, it is possible to manufacture reversibly detachable adhesive and lacquer films (e.g., foil lacquers) which can be detached and rejoined as often as desired.

In addition, these metal complexes have a corrosion-inhibiting effect since they stabilize the level of oxidation of the complexed metal atoms, thus preventing the metal from further oxidation. If the complex formation is irreversible, the corrosion-inhibiting effect is further intensified.

Through the selective functionalization or substitution, polymers having pyridine oligomer-containing ligands are accessible as well. Because of this, it is possible to form not only ultra-thin ligand layers on surfaces but also thicker (adjustable) polymer layers via the metal complexation.

Compounds featuring this property profile include, for example, terpyridine-substituted polyethylene glycols. These can, in addition, be provided with further functional groups which are used, for example, for a reaction with other polymers or resins.

Figure 2:
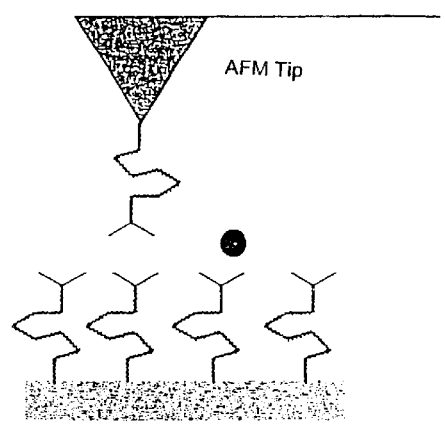
FIG. 2 shows a schematic diagram demonstrating using ligands bonded to an AFM tip to prove the ability of ligands to form metal complexes.
Figure 3:
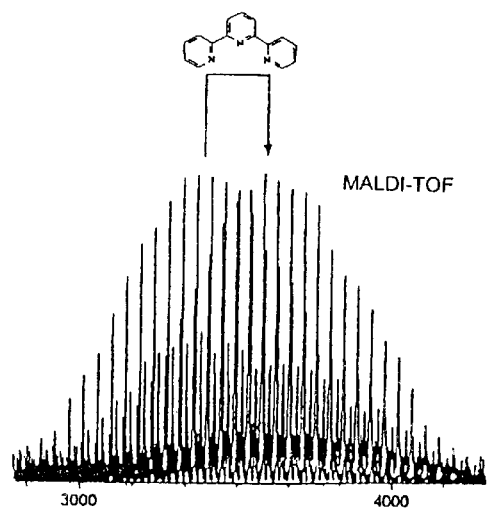
FIG. 3 shows a schematic graphical representation demonstrating using MALDI-TOF-MS to prove the ability of ligands to form metal complexes.

This ability of the ligands or ligand-containing polymers to form metal complexes can be proved, for example, with the assistance of ligands or polymers bonded to AFM tips, as shown in FIG. 2, or also in solution with the assistance of MALDI-TOF-MS, as shown in FIG. 3.

The ligand layers are applied to the metal surface (e.g., steel, galvanized steel, aluminum, magnesium), for example, in dissolved form so as to produce a thin film.

Then, the adhesive or lacquer can be applied to this film and cured. The ligand layers according to the present invention make it possible to switch back and forth between adhesion and deadhesion as desired. This can be used for a simple and energy-saving recycling concept in the construction of automobiles, aircraft, rail vehicles and machines.

Thus, for example, the lacquer coat of an aircraft can be easily detached by supplying thermal and/or electric energy. In this manner, the heretofore very complicated method of delacquering may be markedly simplified.

In automobile construction, such a system can be used, for example, for adhesive tapes. For example, in the case of a repair, subsequent to the curing of the adhesive tapes, the bond can be reversibly detached via the ligand layer. The same effect can also be used in connection with conventional adhesives which can react with the ligand layer via reactive terminal groups thereof during cross-linking.

If these ligands are provided with a long-chain hydrophobic group, they form a thin film when being applied to a metal surface. This film acts as corrosion protection since the complexed metal atoms are stabilized in their level of oxidation, and the metal surface is consequently protected from further oxidation. Due to the layer formation, moreover, it is possible to protect structures having large surfaces.

The following example illustrates the present invention and is not to be understood in a limiting manner.

EXAMPLE n-octyl bipyridine whose n-octyl group carries a terminal epoxide group, is dissolved in THF, and the solution is applied to a metal surface. Subsequent to the evaporation of the solvent, a conventional epoxy adhesive is applied to the resulting primer layer and cured. In the process, the primer does not diffuse into the adhesive since it has already reacted with the metal surface. The deadhesion of the primer/adhesive composite is carried out by applying a direct voltage of approximately 10 V. By reversing the potential, it is possible for the primer/adhesive composite to bond to the metal surface again.

What is claimed is:

1. A ligand layer on a surface of a metal, the ligand layer being capable of being reversibly switched between adhesion and deadhesion, the ligand layer comprising substituted pyridine dimers and/or pyridine trimers which are selected from the group consisting of:

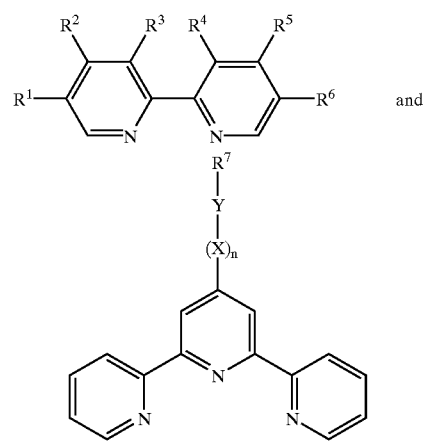

and $R^1$ through $R^6$ being equal or different and being selected from the group consisting of —R—CH(O)CH$_2$, OH, —O—R, NR$_2$, NHR, NH$_2$, CO$_2$H, CO$_2$R, R and H, R being selected from the group consisting of alkyl and aryl residues, not all residues $R^1$ through $R^6$ being hydrogen atoms at a same time;

$R^7$ being selected from the group consisting of —R—CH(O)CH$_2$, OH, —O—R, NR$_2$, NHR, NH$_2$, CO$_2$H, CO$_2$R, CONHR, R and H, R being selected from the group consisting of alkyl and aryl residues;

Y being selected from the group consisting of silicon, carbon, nitrogen, phosphorus and oxygen atoms; and X being an oxygen, sulfur or phosphorus atom, and n having a value of 0 or 1.

2. The ligand layer as recited in claim 1 wherein:

$R^1$ through $R^6$ are selected from the group consisting of —R—CH(O)CH$_2$, —O—R, CO$_2$R, CONHR and R, R being selected from the group consisting of alkyl and aryl residues;

$R^7$ is selected from the group consisting of —R—CH(O)CH$_2$, —O—R, CO$_2$H, CO$_2$R, NR$_2$ and R, R being selected from the group consisting of alkyl and aryl residues; and X is an oxygen atom, and n has a value of 1.

3. The ligand layer as recited in claim 1 wherein the metal is selected from groups II through XIV of the periodic system.

4. The ligand layer as recited in claim 1 wherein the metal is selected from alloys including at least one first metal selected from groups II through XIV of the periodic system.

5. The ligand layer as recited in claim 1 wherein the metal is selected from the group consisting of iron, zinc, aluminum, magnesium, platinum, silver, gold, chromium, nickel, titanium, copper, scandium, zirconium, vanadium, molybdenum, manganese, tungsten and cobalt.

6. The ligand layer as recited in claim 1 wherein the metal is selected from alloys including at least one first metal selected from the group consisting of iron, zinc, aluminum, magnesium, platinum, silver, gold, chromium, nickel, titanium, copper, scandium, zirconium, vanadium, molybdenum, manganese, tungsten and cobalt.

7. A method for reversibly switching a ligand layer on a metal surface, the ligand layer being capable of being reversibly switched between adhesion and deadhesion, the ligand layer comprising substituted pyridine dimers and/or pyridine trimers which are selected from the group consisting of:

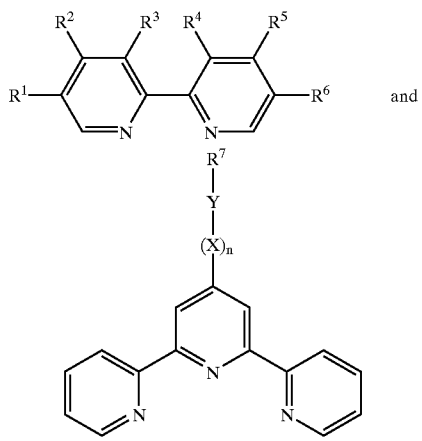

and $R^1$ through $R^6$ being equal or different and being selected from the group consisting of —R—CH(O)CH$_2$, OH, —O—R, NR$_2$, NHR, NH$_2$, CO$_2$H, CO$_2$R, R and H, R being selected from the group consisting of alkyl and aryl residues, not all residues $R^1$ through $R^6$ being hydrogen atoms at a same time; $R^7$ being selected from the group consisting of —R—CH(O)CH$_2$, OH, —O—R, NR$_2$, NHR, NH$_2$, CO$_2$H, CO$_2$R, CONHR, R and H, R being selected from the group consisting of alkyl and aryl residues; Y being selected from the group consisting of silicon, carbon, nitrogen, phosphorus and oxygen atoms; X being an oxygen, sulfur or phosphorus atom, and n having a value of 0 or 1, the method comprising:

applying a primer solution so as to form a primer film;
drying the primer film;
applying an adhesive or lacquer;
curing the adhesive or lacquer so as to form a respective primer/adhesive composite or primer/lacquer composite; and
causing deadhesion of the primer/adhesive composite or primer/lacquer composite by at least one of applying a direct voltage to the composite, changing a pH of the composite and changing a temperature of the composite.

8. The ligand layer as recited in claim 7 wherein:
$R^1$ through $R^6$ are selected from the group consisting of —R—CH(O)CH$_2$, —O—R, CO$_2$R, CONHR and R with R being selected from the group consisting of alkyl and aryl residues;

$R^7$ is selected from the group consisting of —R—CH(O)CH$_2$, —O—R, CO$_2$H, CO$_2$R, NR$_2$ and R with R being selected from the group consisting of alkyl and aryl residues; and X is an oxygen atom, and n has a value of 1.

9. The ligand layer as recited in claim 7 wherein the metal is selected from groups II through XIV of the periodic system.

10. The ligand layer as recited in claim 7 wherein the metal is selected from alloys including at least one first metal selected from groups II through XIV of the periodic system.

11. The ligand layer as recited in claim 7 wherein the metal is selected from the group consisting of iron, zinc, aluminum, magnesium, platinum, silver, gold, chromium, nickel, titanium, copper, scandium, zirconium, vanadium, molybdenum, manganese, tungsten and cobalt.

12. The ligand layer as recited in claim 7 wherein the metal is selected from alloys including at least one first metal selected from the group consisting of iron, zinc, aluminum, magnesium, platinum, silver, gold, chromium, nickel, titanium, copper, scandium, zirconium, vanadium, molybdenum, manganese, tungsten and cobalt.

13. The method as recited in claim 7 wherein the direct voltage has a first polarity and further comprising causing a repeated adhesion of the respective primer/adhesive composite or primer/lacquer composite by at least one of applying to the composite a second direct voltage having a second polarity opposite the first polarity, changing the pH of the composite, or changing the temperature of the composite.

14. The method as recited in claim 7 wherein the causing the deadhesion is performed by the applying the direct voltage to the composite, the direct voltage being in a range from 1.0 to 1,000 V.

15. The method as recited in claim 13 wherein the causing the repeated adhesion is performed by the applying the second direct voltage to the composite, the second direct voltage being in a range from 1.0 to 1,000 V.

16. The method as recited in claim 7 wherein the causing the deadhesion is performed by the changing the pH of the composite to a pH value in a range from 1 to 13.

17. The method as recited in claim 13 wherein the causing the repeated adhesion is performed by the changing the pH of the composite to a pH value in a range from 1 to 13.

18. The method as recited in claim 7 wherein the causing the deadhesion is performed by the changing the temperature of the composite, the changing the temperature being performed by raising the temperature to a range of 40 to 250° C.

19. The method as recited in claim 13 wherein the causing the repeated adhesion is performed by the changing the temperature of the composite, the changing the temperature being performed by reducing the temperature to an initial temperature.

20. A method for inhibiting metal corrosion, the method comprising applying a ligand layer to a metal surface, the ligand layer being capable of being reversibly switched between adhesion and deadhesion, the ligand layer including substituted pyridine dimers and/or pyridine trimers which are selected from the group consisting of

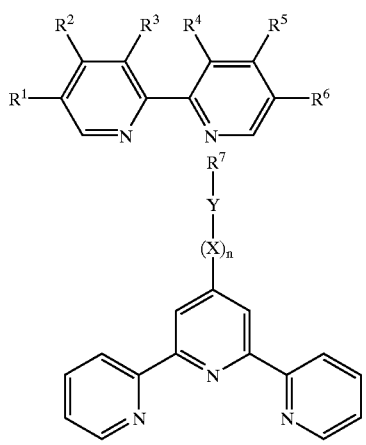

and $R^1$ through $R^6$ being equal or different and being selected from the group consisting of —R—CH(O)CH$_2$, OH, —O—R, NR$_2$, NHR, NH$_2$, CO$_2$H, CO$_2$R, R and H, R being selected from the group consisting of alkyl and aryl residues, not all residues $R^1$ through $R^6$ being hydrogen atoms at the same time;

$R^7$ being selected from the group consisting of —R—CH(O)CH$_2$, OH, —O—R, NR$_2$, NHR, NH$_2$, CO$_2$H, CO$_2$R, CONHR, R and H, R being selected from the group consisting of alkyl and aryl residues;

Y being selected from the group consisting of silicon, carbon, nitrogen, phosphorus and oxygen atoms; and X being an oxygen, sulfur or phosphorus atom, and n having a value of 0 or 1.

21. The ligand layer as recited in claim 20 wherein:

$R^1$ through $R^6$ are selected from the group consisting of —R—CH(O)CH$_2$, —O—R, CO$_2$R, CONHR and R, R being selected from the group consisting of alkyl and aryl residues;

$R^7$ is selected from the group consisting of —R—CH(O)CH$_2$, —O—R, CO$_2$H, CO$_2$R, NR$_2$ and R with R being selected from the group consisting of alkyl and aryl residues; and X is an oxygen atom, and n has a value of 1.

22. The ligand layer as recited in claim 20 wherein the metal is selected from groups II through XIV of the periodic system.

23. The ligand layer as recited in claim 20 wherein the metal is selected from alloys including at least one first metal selected from groups II through XIV of the periodic system.

24. The ligand layer as recited in claim 20 wherein the metal is selected from the group consisting of iron, zinc, aluminum, magnesium, platinum, silver, gold, chromium, nickel, titanium, copper, scandium, zirconium, vanadium, molybdenum, manganese, tungsten and cobalt.

25. The ligand layer as recited in claim 20 wherein the metal is selected from alloys including at least one first metal selected from the group consisting of iron, zinc, aluminum, magnesium, platinum, silver, gold, chromium, nickel, titanium, copper, scandium, zirconium, vanadium, molybdenum, manganese, tungsten and cobalt.

* * * * *